United States Patent
Netter

(10) Patent No.: US 10,279,757 B2
(45) Date of Patent: May 7, 2019

(54) CONTROL DEVICE UPDATE IN A MOTOR VEHICLE

(71) Applicant: Audi AG, Ingolstadt (DE)

(72) Inventor: Florian Netter, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/763,080

(22) PCT Filed: Oct. 27, 2016

(86) PCT No.: PCT/EP2016/001788
§ 371 (c)(1),
(2) Date: Mar. 23, 2018

(87) PCT Pub. No.: WO2017/071811
PCT Pub. Date: May 4, 2017

(65) Prior Publication Data
US 2018/0272964 A1    Sep. 27, 2018

(30) Foreign Application Priority Data
Oct. 30, 2015   (DE) .................. 10 2015 014 049

(51) Int. Cl.
*G06F 8/65*    (2018.01)
*B60L 50/15*   (2019.01)
(Continued)

(52) U.S. Cl.
CPC .......... *B60R 16/0231* (2013.01); *B60L 50/15* (2019.02); *B60L 58/12* (2019.02);
(Continued)

(58) Field of Classification Search
CPC ........ G06F 21/45; G06F 8/65; G06F 9/44505; G06F 8/61; G06F 8/60; B60R 16/023;
(Continued)

(56) References Cited

U.S. PATENT DOCUMENTS 7,239,252 B2 *  7/2007  Kato ...................... G08G 1/143
                                                        340/426.16
7,366,589 B2    4/2008  Habermas
(Continued)

FOREIGN PATENT DOCUMENTS

DE      102005021103 A1    12/2005
DE      102009036943 A1     3/2011
(Continued)

OTHER PUBLICATIONS

International Search Report and Written Opinion of the International Searching Authority directed to related International Patent Application No. PCT/EP2016/001788, dated Mar. 22, 2017, with attached English-language translation; 18 pages.
(Continued)

*Primary Examiner* — Marina Lee
(74) *Attorney, Agent, or Firm* — Sterne, Kessler, Goldstein & Fox P.L.L.C.

(57) ABSTRACT

A method is disclosed for adjusting a configuration data set in a control device of a motor vehicle. The configuration data set is to be installed reliably in the control device. According to the disclosure, an energy requirement of all vehicle components required for the adjustment of the configuration data set is predicted, a currently available remaining energy of an energy storage device of the motor vehicle is determined, and during a parked phase of the motor vehicle, when the drive motor is switched off, a trigger signal for adjusting the configuration data set is transmitted to the vehicle components if the currently remaining energy is greater than the predicted energy requirement. A control apparatus for carrying out the method and a motor vehicle having the control apparatus are also disclosed.

12 Claims, 2 Drawing Sheets

(51) Int. Cl.
    *B60L 58/12* (2019.01)
    *G06F 9/445* (2018.01)
    *H04L 29/08* (2006.01)
    *B60R 16/023* (2006.01)

(52) U.S. Cl.
    CPC ............ *G06F 8/65* (2013.01); *G06F 9/44505* (2013.01); *H04L 67/34* (2013.01); *B60L 2240/44* (2013.01); *B60L 2260/22* (2013.01); *B60L 2260/46* (2013.01); *B60L 2270/40* (2013.01); *Y02T 10/7005* (2013.01); *Y02T 10/705* (2013.01); *Y02T 10/7044* (2013.01); *Y02T 10/7077* (2013.01)

(58) Field of Classification Search
    CPC .... B60L 11/12; B60L 11/1861; B60L 67/342; B60L 2240/44; B60L 2260/22; B60L 2260/46; B60L 2270/40; B60L 50/15; B60L 58/12; Y02T 10/705; Y02T 10/7077; Y02T 10/7044; Y02T 10/7005
    USPC .......................................... 717/121, 168–178
    See application file for complete search history.

(56) References Cited

U.S. PATENT DOCUMENTS

| | | | |
|---|---|---|---|
| 8,655,541 B2 | 2/2014 | You | |
| 8,914,173 B2* | 12/2014 | Biondo | B60L 1/003 180/65.265 |
| 9,229,704 B2* | 1/2016 | Throop | G06F 8/65 |
| 9,296,302 B2 | 3/2016 | Birke et al. | |
| 9,424,047 B2 | 8/2016 | Hall et al. | |
| 9,529,584 B2 | 12/2016 | Eling | |
| 9,564,051 B2* | 2/2017 | Hainzlmaier | G08G 1/09626 |
| 9,904,531 B2* | 2/2018 | Suzuki | G06F 8/65 |
| 2006/0075307 A1* | 4/2006 | Sano | G06F 1/28 714/38.1 |
| 2008/0140941 A1* | 6/2008 | Dasgupta | G06F 17/30132 711/137 |
| 2009/0300595 A1* | 12/2009 | Moran | G06F 8/65 717/170 |
| 2011/0222447 A1* | 9/2011 | Wang | H04L 1/188 370/310 |
| 2011/0307882 A1* | 12/2011 | Shiba | G06F 8/65 717/173 |
| 2012/0158228 A1* | 6/2012 | Biondo | B60L 1/003 701/22 |
| 2013/0179877 A1* | 7/2013 | Dain | G06F 8/60 717/178 |
| 2013/0197712 A1 | 8/2013 | Matsuura et al. | |
| 2013/0261942 A1* | 10/2013 | McQuade | F02D 29/02 701/115 |
| 2014/0109075 A1* | 4/2014 | Hoffman | G06F 8/65 717/169 |
| 2014/0254543 A1* | 9/2014 | Engelhard | H04W 64/006 370/329 |
| 2014/0351803 A1 | 11/2014 | Hoffman et al. | |
| 2014/0359593 A1* | 12/2014 | Cohen | G06F 8/65 717/169 |
| 2015/0113521 A1* | 4/2015 | Suzuki | G06F 8/65 717/173 |
| 2015/0154864 A1* | 6/2015 | Hainzlmaier | G08G 1/09626 340/905 |
| 2015/0277890 A1* | 10/2015 | Throop | G06F 8/65 717/172 |
| 2016/0077827 A1* | 3/2016 | Throop | G06F 8/65 717/168 |
| 2018/0272964 A1* | 9/2018 | Netter | H04L 67/34 |

FOREIGN PATENT DOCUMENTS

| | | |
|---|---|---|
| DE | 102011088320 A1 | 3/2013 |
| DE | 102012023648 A1 | 6/2014 |
| DE | 102014215410 A1 | 2/2015 |
| DE | 102014115943 A1 | 5/2015 |
| DE | 102015103995 A1 | 10/2015 |
| EP | 2706457 A1 | 3/2014 |
| EP | 2876553 A1 | 5/2015 |
| WO | WO 2014165197 A1 | 10/2014 |

OTHER PUBLICATIONS

English-language abstract of German Patent Application Publication No. DE 102012023648 A1, published Jun. 5, 2014; 1 page.
International Preliminary Report on Patentability directed to related International Patent Application No. PCT/EP2016/001788, with attached English-language translation, dated Oct. 12, 2017; 14 pages.

\* cited by examiner

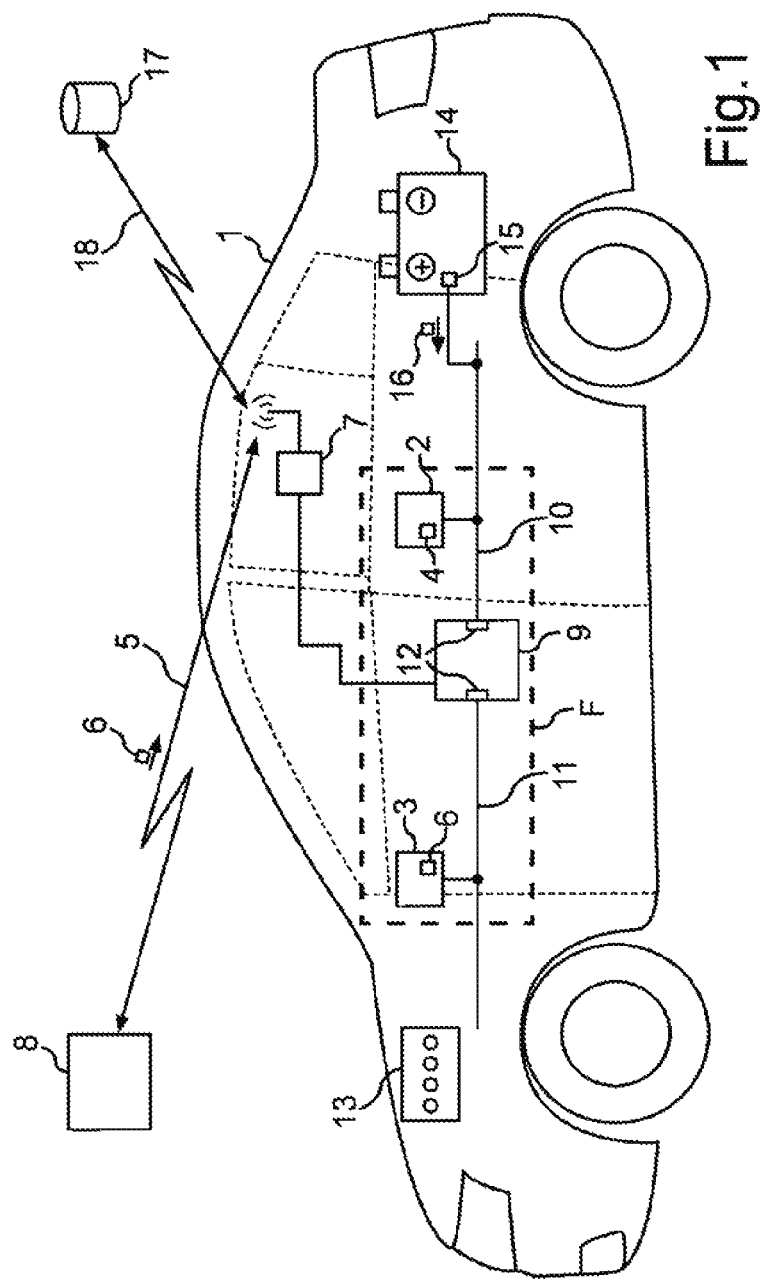

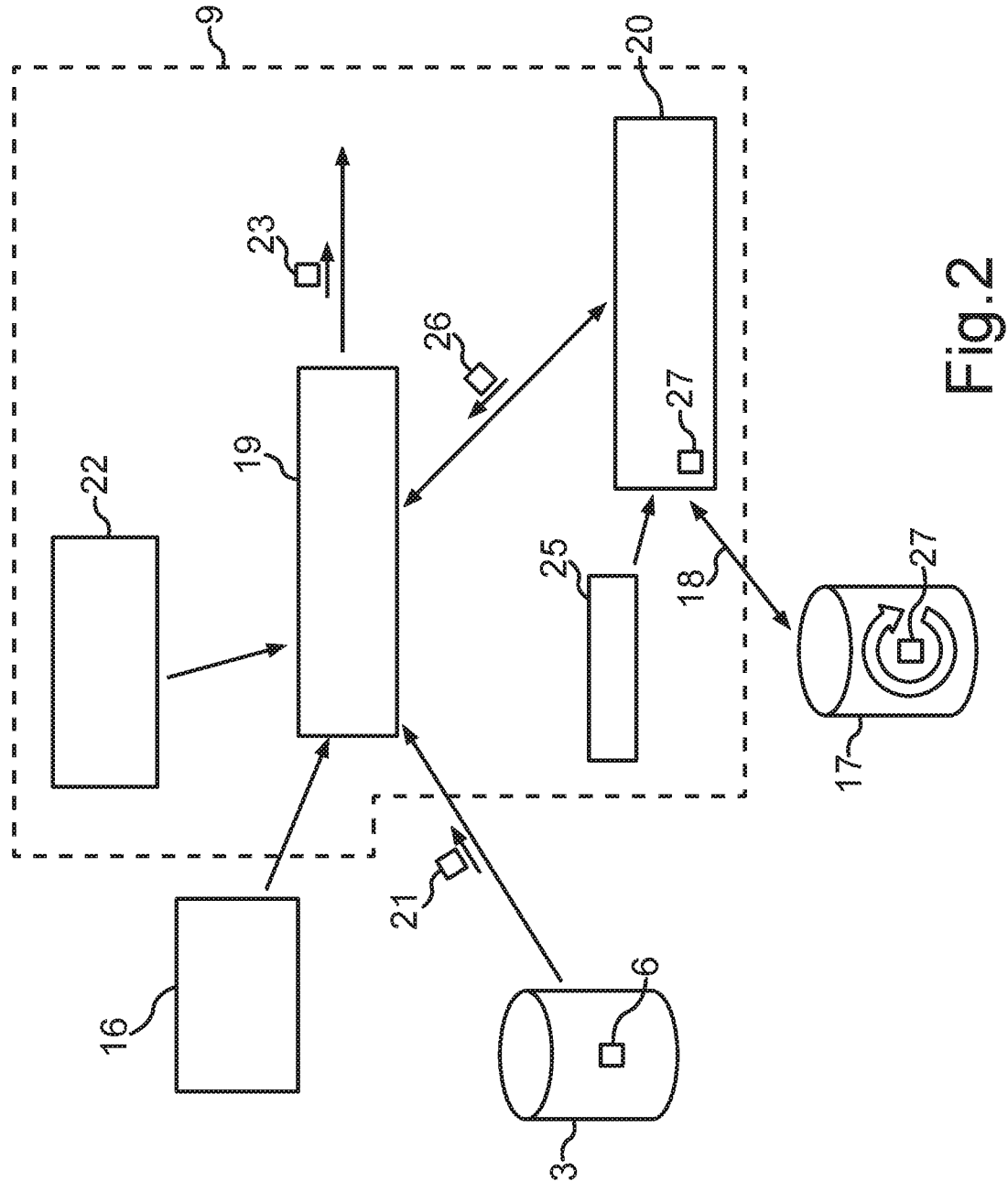

CONTROL DEVICE UPDATE IN A MOTOR VEHICLE

TECHNICAL FIELD

This application relates to a method for setting up a configuration data set in a control device of a motor vehicle. The configuration data set may be a software update for the control device, for example. This application also includes a control apparatus for carrying out the method disclosed herein, and a motor vehicle having the control apparatus disclosed herein.

BACKGROUND

A configuration data set can be transmitted to a motor vehicle via a radio link from a central server device. This process is referred to as over-the-air update (OTA update for short). The radio link can be furnished by means of a WLAN (wireless local area network) radio module or a mobile radio module, for example.

By way of example, a motor vehicle cannot be reconfigured or updated during a journey, because it is not possible to update the software of a control device during operation of the motor vehicle. This would be inappropriate for, by way of example, safety reasons. Furthermore, the control device may be needed during the journey. For this reason, the vehicle must be updated when parked, while the drive motor of the motor vehicle is turned off.

However, it must be noted in this case that the operation of the control device for setting up a configuration data set places a load on the energy storage device of the motor vehicle—that is, the vehicle battery, for example. Recharging the energy storage device is not possible, because no recharging generator is in operation in the parked phase. Whether the configuration data set can be successfully installed or setup is thus dependent on the energy content of the energy storage device. Otherwise, the operation of a control device in the parked phase can result in the energy storage device being drained, such that the control device no longer has access to sufficient power from the energy storage device, and it is necessary to abort the setup or modification of the configuration data set. In the worst case, this can leave the control device in a disabled state, such that the control device must be repaired in a workshop.

A control device of a charging system of an electric vehicle for this purpose is known from DE 10 2009 036 943 A1, which can perform a software update or a firmware update for the charger based on a configuration data set that can be received via an Internet connection or a power supply network.

A motor vehicle is known from EP 2 706 457 A1, which can receive a configuration data set via a USB memory or via a radio link. The configuration data set is received in this case by an infotainment system (information entertainment system) and forwarded via a communication bus in the motor vehicle to the receiver/control device.

A motor vehicle is known from WO 2014/165197 A1, which can collect operating data of the motor vehicle for a user of the motor vehicle via a network, and display it to the user on a screen. The operating data relate in particular to a current state of charge of an energy storage device of the motor vehicle, which can include, for example, batteries or double-layer capacitors.

US 2013/0197712 A1 describes a method for operating a motor vehicle in order to update a control program in a control device in the motor vehicle. In this case, the energy required for this update is verified and compared with the current state of charge of the vehicle battery. In order to prevent, after the ignition of the motor vehicle is switched off, all of the control devices that need an update from simultaneously evaluating the ignition-off signal, a time offset for reading out the ignition-off signal is programmed into the control devices.

BRIEF DESCRIPTION OF THE DRAWINGS/FIGURES

The accompanying drawings are incorporated herein and form a part of the specification.

FIG. 1 shows a schematic representation of an exemplary embodiment of the motor vehicle according to this disclosure.

FIG. 2 shows a schematic representation of an exemplary embodiment of the control apparatus according to this disclosure, which can be provided in exemplary embodiments of the motor vehicle.

In the figures, functionally identical elements are indicated with the same reference numerals.

DETAILED DESCRIPTION

The problem addressed by this application is that of preventing, in a motor vehicle, a deep discharge of the energy storage device due to an update of a configuration data set carried out automatically in a control device.

The problem is addressed by the subject matters of the independent claims. Advantageous developments of the disclosed method and apparatus result from the features of the dependent claims.

This disclosure provides a method for installing or setting up a configuration data set in a control device of a motor vehicle. The configuration data set can be, for example, a software update for the control device—that is, an updated version of a control program of the control device. Additionally or alternatively, the configuration data set can also comprise, as data types, navigation data and/or parameterization data for adapting an operating behavior of the control device, by way of example. Parameterization data are provided, for example, to adapt an operating program of the control device to the vehicle type of the motor vehicle. For example, a value relating to a wheelbase of the motor vehicle can be set in the control device. Additionally or alternatively, the parameterization data can also be used, for example, to set up or adjust an operating behavior of an ESC (Electronic Stability Control) system.

According to the method, to address the problem, prior to the actual storage or setup of the configuration data set in the control device, an energy requirement is predicted for each vehicle component required for setting up the configuration data set. In addition to the control device itself, further vehicle components may include, for example, at least one communication data bus for in-vehicle transmission of the configuration data set, and/or a memory device for buffering and furnishing the configuration data set. Furthermore, the currently available remaining energy of an energy storage device of the motor vehicle is determined. In other words, the current state of charge of the energy storage device is determined. The energy storage device in this case can be, for example, a vehicle battery of the motor vehicle, or the energy storage device can at least comprise such a vehicle battery.

During the parked phase of the vehicle—that is, when the drive motor of the motor vehicle is switched off—a trigger signal for setting up the configuration data is only transmitted to the control device if the currently remaining energy is greater than the predicted energy requirement. In other words, battery values, for example, are determined and checked or verified to determine whether the update—that is, the setup of the configuration data set—may be started. In other words, the control device is only operated for setting up the configuration data if the remaining energy in the energy storage device is sufficient for this purpose. In the context of this disclosure, available remaining energy is to be understood as meaning the amount of energy that can still be taken from the energy storage device without resulting in a drop below a predetermined energy reserve of the energy storage device. The energy storage reserve can be intended, for example, for restarting an internal combustion engine of the motor vehicle—for example, a gasoline engine or a diesel engine—at the end of the parked phase by means of an electric starter.

This disclosure provides the advantage that the control device, and optionally the other required vehicle components, are only operated in the parked phase to set up the configuration data set if the remaining energy is sufficient. This reliably prevents the update—that is, the setup of the configuration data set—from being terminated or aborted prematurely before the entire setup of the configuration data set in the control device has been completed.

This disclosure relates to the case in which a plurality of configuration data sets are received, each for one control device. According to the method disclosed herein, a second configuration data set for a second control device is received and, likewise, dependency data relating to the first configuration data set and the second configuration data set are also received. The dependency data describe whether the first configuration data set may be configured or installed in the first control device described above, without the second configuration data set also needing to be installed or configured in the second control device. The trigger signal for setting up the configuration data set (in the first control device) is generated in the event that the remaining energy is greater than the described energy requirement, and the configuration data set is independent of the second configuration data set according to the dependency data. This results in the advantage that when a plurality of configuration data sets is present, only a portion of the configuration data sets is installed if the remaining energy is sufficient at least for this portion. This is particularly advantageous if the remaining energy is not sufficient for the setup of all configuration data sets. In addition, in connection with a determination of the anticipated parking duration, a verification is also preferably made—in instances where only a length of time which is needed to install or set up the one configuration data set is available—regarding whether the configuration data set can be configured without the second configuration data set. In other words, during a parked phase, it is possible to dispense with setting up or installing the second configuration data set if it requires a length of time that is greater than the parking duration.

A length of time that is expected to be required for setting up the configuration data in the control device is determined in order to predict the energy requirement. In other words, an anticipated update duration is determined. The amount of energy that is required for the length of time as a whole by all of the necessary vehicle components during operation is determined as the energy requirement. In other words, the amount of time that the update will take is determined. Then, the energy requirement for the operation of each necessary vehicle component is determined. The necessary vehicle components and the respective energy consumption of, for example, each vehicle component can be determined in advance, and can be furnished as a table or database, by way of example. This has the advantage that information on the anticipated length of time of the update is also available in this case. In this way, it can be determined—for example, on the basis of the time of day—whether it is probable that the update can be carried out successfully given the length of time before the parked phase is ended. For example, it is unlikely at two o'clock in the morning that an update that requires a length of time of, for example, one hour will be interrupted by the parked phase ending. The time duration can be determined, by way of example, on the basis of a data volume or an amount of data of the configuration data set. For this purpose, a processing speed that specifies how much time is required per unit of data volume—for example, 1 kilobyte—can be used as the basis.

In connection with the determination of the length of time, a monitoring device determines at least one usage pattern of a use of the motor vehicle by the driver. In other words, the device monitors which times the driver uses the motor vehicle and/or at which locations the driver parks for how long. As such, at least one location where the motor vehicle has already been parked once is described by the usage pattern, and the duration of the parked phase is indicated. Furthermore, the usage pattern may also indicate the day of the week and/or give an indication of weekday/holiday, the season, and/or a previously observed event. For example, the fact that a child seat is fastened in the motor vehicle can be determined as an event. If a parking space in front of a kindergarten is determined as the parking location, it can be assumed that a child getting into or out of the vehicle can be taken as the reference usage pattern, and the parked phase will comprise a predetermined parking duration necessary for this process that corresponds to the previous observation. At the beginning of a parked phase, an anticipated parking duration is then determined on the basis of the at least one usage pattern, and the trigger signal is generated only if the parking duration corresponds to at least the length of time necessary for setting up the configuration data. As such, the time and manner in which the driver moves or uses the motor vehicle are learned. The estimated parking duration can be derived therefrom. By comparing a current usage case—that is, the current driving situation or parking situation—with the at least one usage pattern, the probable duration of the current parked phase can then be determined. In addition to calendar data, other data can be used for the usage pattern, such as data from a social network for location data, for example. In-vehicle and off-vehicle data sources can be evaluated.

In order to determine the at least one usage pattern, behavioral data of the driver are determined in the motor vehicle and/or from an external data source. In particular, travel route data and/or operating time data—that is, times, times of day, or days on which the motor vehicle is operated—are also included in operating data of the motor vehicle. Behavioral data of the driver includes the identity of the driver and/or usage data concerning at least one telephone and/or infotainment system used by the driver in the motor vehicle, or the driver's schedule data that can be received, for example, from a driver's mobile device and/or from an Internet scheduling application. An external data source can be, for example, a social network on the Internet in which, for example, driver habits are presented. By means of a method for machine learning, repeating values of the operating data and/or behavioral data are determined and combined to form the at least one usage pattern. Methods for machine learning are in themselves available in the prior art. They can be adapted with little effort to the described problem of recognizing a usage pattern on the basis of operating data and/or behavioral data. The method for the machine learning can be carried out, for example, by a processor device of the motor vehicle itself, and/or by a processor device of a server device, which can be part of the Internet, a cloud, and/or a corporate network, for example. For this purpose, the operating data and/or behavioral data can be transmitted via a radio link from the motor vehicle to the server device.

The invention includes optional developments, the features of which provide additional advantages.

According to a development, at least one vehicle component required for the setup of the configuration data set is determined on the basis of networking architecture data. Such networking architecture data particularly describe the communication links or communication paths between control devices of the motor vehicle. Such networking architecture data is available as part of the design data of the motor vehicle. The networking architecture data can be used to determine in an advantageous manner which communication bus is required for transmitting the configuration data set from a memory device of the motor vehicle and/or from a radio module of the motor vehicle to the control device. The radio module can be used to receive the configuration data set during the parked phase and provide it to the control device. In addition to the determination, it is also relevant that control devices can be switched on or connected for the setup of the configuration data set—that is, only the control devices that are relevant for the update. This leads to further energy savings compared to the approach in which all control devices and all vehicle buses are activated.

In one advantageous development, however, the configuration data set is received from an off-vehicle data source during a driving operation of the motor vehicle, when the drive motor is switched on. The off-vehicle data source may be, for example, a server of the Internet. This development has the advantage that the configuration data set is already available at the beginning of the parked phase, and thus no energy is required for receiving the configuration data set during the parked phase.

This disclosure also includes a control apparatus for a motor vehicle. The control apparatus has a data input for receiving state data of an energy storage device, and a control output for controlling vehicle components of the motor vehicle. The state data of the energy storage device can indicate, for example, a current state of charge of the energy storage device. The state data can also describe, for example, an electric current drawn from the energy storage device. The remaining energy can then be determined, for example, by integrating the amount of current. The control apparatus is designed to carry out an embodiment of the method according to this disclosure. The control apparatus can be provided, for example, as a control device. In particular, the control apparatus is provided as a gateway for connecting or coupling at least two communication buses of the motor vehicle. For example, an Ethernet communication bus can be coupled to a CAN (Controller Area Network) communication bus by the gateway.

Finally, this disclosure also comprises a motor vehicle which has an embodiment of the control apparatus disclosed herein. The motor vehicle is preferably designed as an automobile, in particular as a passenger car.

An exemplary embodiment of this disclosure is described below, wherein:

FIG. 1 shows a schematic representation of an exemplary embodiment of the motor vehicle according to this disclosure; and FIG. 2 shows a schematic representation of an exemplary embodiment of the control apparatus according to this disclosure, which can be provided in exemplary embodiments of the motor vehicle.

The embodiment explained below is a preferred embodiment of this disclosure. In the embodiment, the described components of the embodiment each represent individual features that are to be considered independently of each other. The independent features shall be considered as part of this disclosure both individually and in one or more different combination(s) than the one shown. Furthermore, the described embodiment can also be supplemented by further features already described above.

In the figures, functionally identical elements are indicated with the same reference numerals.

In this regard, FIG. 1 shows a motor vehicle 1, which may be, for example, an automobile, and in particular a passenger car. The motor vehicle 1 can have control devices 2, 3, which are operated by a control program 4. In the example illustrated in FIG. 1, only the control program 4 for the control device 2 is shown.

In the case of the motor vehicle 1, it is possible to update the control program 4 of the control device 2 with an OTA update (over-the-air update) without the motor vehicle 1 having to be taken to a workshop by the user (not shown). Instead, the motor vehicle 1 can receive, via a radio link 5, a configuration data set 6 that has current data for the control device 2—such as update software, by means of which the control program 4 can be replaced, or parameterization data for parameterizing the control program 4, or navigation data for updating navigation information. The control program 4 and/or at least one further control device (not shown) of the motor vehicle 1 can be accordingly designed for such an OTA update.

For receiving the configuration data set 6, the motor vehicle 1 can have a radio module 7, which may be, for example, a mobile radio module or a WLAN radio module. The radio module 7 can be operated as a mobile radio module, by way of example, according to the GSM, UMTS, LTE and/or 5G standards, or another mobile radio standard. The configuration data set 6 can be furnished, for example, by a first server device 8, which can be, for example, a server of the Internet.

The update—that is, the setup or installation of the configuration data set 6 in the control device 2—can be controlled by a control apparatus 9, which in the example shown can be a gateway via which a first communication bus 10 and a second communication bus 11 can be coupled or connected. The communication bus 10 can be, for example, a CAN (controller area network) bus. The communication bus 11 can be, for example, an Ethernet data network. The control apparatus 9 can be connected to the communication buses 10, 11, for example via bus terminals 12. The bus terminals 12 also constitute a data input and a control output in the context of this disclosure. In the motor vehicle 1, the control apparatus 9 performs the setup of the configuration data set 6 in the control device 2 only during a parked phase in which a drive motor 13 of the motor vehicle 1 is turned off. The drive motor 13 can be, for example, an internal combustion engine and/or an electric machine. While the motor vehicle 1 is switched off, the control device 2 and all other vehicle components involved in the update must be supplied with electrical energy by an energy storage device 14 of the motor vehicle 1. The energy storage device 14 can be, by way of example, a vehicle battery, such as a 12V battery or a 48V battery. In FIG. 1, the corresponding electrical connections are not shown.

The motor vehicle 1 can have a sensor device 15, which can determine a current operating state of the energy storage device 14 as operating state data 16, and signal the control apparatus 9. The operating state data 16 can, for example, describe or indicate the current state of charge of the energy storage device 14. The operating state data 16 can also indicate further battery values, such as an electrical current, an electrical voltage, and/or a temperature of the energy storage device 14. The operating state data 16 can be transmitted to the control apparatus 9, for example, via one or both of the communication buses 10, 11.

The configuration data set 6 can be transmitted or received via the radio link 5—for example, during a journey of the motor vehicle 1, when the drive motor 13 is switched on. The configuration data set 6 can then be received, for example, by the control device 3 from the radio module 7 and stored in the control device 3. For this purpose, the control device 3 and the radio module 7 can be coupled to each other, for example, via one of the communication buses 10, 11 or via both communication buses 10, 11. In addition to the configuration data set 6, a configuration data set (not shown) can be received for each of at least one further control device, and can be stored, for example, in the control device 3. Also, the control device 3, triggered by the control apparatus 9, can update itself. The update data - that is, the configuration data set 6—can also be stored in the radio module 7 or in the control device 3.

After the drive motor 13 is switched off, the control apparatus 9 then carries out the method described below with reference to FIG. 2.

In this regard, FIG. 2 again shows the control apparatus 9, the control device 3 in which the configuration data set 6 is stored, and a second server device 17, to which a radio link 18 can be established via the radio module 7 (see FIG. 1) during operation of the motor vehicle 1 and/or during the parked phase.

The control apparatus 9 can have a first functional module 19 and a second functional module 20. The two functional modules 19, 20 can each be provided as a program module for a processor device of the control apparatus 9.

The first functional module 19 performs a prediction on the basis of the operating state data 16 of the energy storage device 14 (see FIG. 1) and checks whether the update for the control device 2 may be started. For this purpose, the first functional module 19 predicts, on the basis of the data volume (or the amount of data) 21 of the configuration data set 6, how long the update process will take for the control device 2 and/or for the at least one further control device, wherein a configuration data set (not shown) is saved for each of these in the control device 3. Each indication regarding the data volume 21 can be signaled to the control apparatus 9 by the control device 3, for example. For example, a conversion factor can be provided for the calculation of the duration of the update process, furnishing, by way of example, a time specification per byte, which can then be multiplied by the data volume 21. On the basis of the operating state data 16 of the energy storage device 14, a determination is made of whether there is enough electrical energy in the energy storage device 14 for the operation of all the vehicle components required to carry out the update. In this case, the first functional module 19 can determine which vehicle components must be operated using the information 22 about the motor vehicle 1, wherein the information 22 describes, for example, a networking architecture - that is, for example, the communication buses 10, 11, energy consumption of the individual control devices 2, 3, and the number of control devices involved.

In the example illustrated in FIG. 1, at least the control device 3, the control apparatus 9, and the control device 2, as well as the communication buses 10 and 11, must be operated in order to transmit the configuration data set 6 from the control device 3 into the control device 2. The required vehicle components F are indicated in FIG. 1.

If it is determined on the basis of the battery values or operating state data 16 that sufficient power or energy is available in the energy storage device 14 for the time of the update process, a trigger signal 23 is generated to start the update. According to the trigger signal 23, the communication buses 10, 11, for example, can then be activated by the control apparatus 9, and wake-up signals can be sent to the control devices 2 and 3 via the communication buses. In addition, update commands can then be issued that cause the control device 3 to send out the configuration data set 6 to the control device 2. Such a command can also be generated by the control device 2 itself according to its own update command.

Because the configuration data set 6 was downloaded during the journey and cached in the motor vehicle 1, the update can then be carried out in the stationary/parked phase even if the motor vehicle 1 is in an underground parking garage or where no mobile network is available during the parked phase.

An optional further development of the method illustrated in FIG. 2 is described below.

This extension of the concept provides for learning how the driver moves the motor vehicle 1, so as to determine an optimal time for the update. If, for example, the driver drives his children to kindergarten every day between 8 and 8:30 a.m., the update could be carried out after the motor vehicle 1 has been switched off. In this case, for example, the system has learned that the motor vehicle 1 is always parked at least five minutes at the kindergarten. If the update would take less than five minutes, the update could be started in this case. However, if it takes more than five minutes, another time must be determined. In other words, the trigger signal 23 is not generated in this case during the parked phase in front of the kindergarten. Estimating the duration of parking also has the advantage that the update is always ready when the driver comes back to the motor vehicle 1. If the driver behavior is not learned, it could happen, for example, that the driver turns off the motor vehicle 1, the update is started, and the driver—for example, if he comes back after one minute—cannot drive away in the motor vehicle 1 because the control device is still blocked by the update or is inoperative. The learning therefore makes it possible to determine safe update times, which thereby offer greater convenience.

For this, however, the behavior of the driver must first be learned in order to predict it later. For this purpose, the second functional module 20 is included in the control apparatus 9, and is designed for learning the driver's behavior. For this purpose, a method from the field of machine learning and/or artificial intelligence can be implemented or realized by the second functional module 20. The driver's behavior is determined on the basis of behavioral data 25 of the driver, which can be generated by sensors and/or status signals of control devices of the motor vehicle 1. External data sources, including social networks, and other data and/or schedule data can be utilized to learn the driver's behavior. Data from in-vehicle data sources can also be used. The learned user behavior is then stored at least as a behavior or usage pattern 27.

The anticipated parking duration 26 can then be determined by the second functional module 20 according to a current driver's behavior, and signaled to the first functional module 19.

The learning of the driver's behavior can additionally or alternatively be performed by the second server device 17 as well. For this purpose, the behavioral data 25 can be transmitted via the radio link 18. The second server device 17 can then determine a usage pattern 27 in an off-line learning method—that is, without a further radio link 18—in the same manner as described in connection with the second functional module 20.

The second functional module 20 and/or the second server device 17 therefore constitute a monitoring device according to this disclosure.

The learned values—that is, the at least one usage pattern 27—are then transmitted back to the motor vehicle 1 via the radio link 18 to allow deciding, inside the motor vehicle 1, when the update will be performed.

Overall, the example shows how a situation-adapted update of vehicle parameters can be carried out according to this disclosure.

The invention claimed is:

1. A method for an adjustment of a configuration data set in a control device of a motor vehicle, comprising:
   predicting an energy requirement of each of a plurality of vehicle components in the motor vehicle required for the adjustment of the configuration data set, further comprising:
      determining a length of time required for the adjustment of the configuration data set;
      determining an amount of energy that is required for the length of time by each of the plurality of vehicle components during operation to fulfill the energy requirement; and
      determining, by the amount of energy, a predicted energy requirement of each of the plurality of vehicle components required for the adjustment of the configuration data set;
   receiving a second configuration data set for a second control device;
   receiving dependency data relating to the configuration data set and the second configuration data set;
   determining a currently-available remaining energy of an energy storage device of the motor vehicle; and
   transmitting, to the control device, a trigger signal for the adjustment of the configuration data set, if during a parked phase when a drive motor of the motor vehicle is switched off, the currently-available remaining energy is greater than the predicted energy requirement, and the configuration data set is independent of the second configuration data set according to the dependency data, further comprising:
      determining, by a monitoring device, at least one usage pattern of a use of the motor vehicle by a driver, further comprising:
         determining behavioral data of the driver from the motor vehicle or from an off-vehicle data source; and
         combining, by machine learning, recurring values of the behavioral data to form the at least one usage pattern, wherein the behavioral data of the driver include at least one of: an identity of the driver, usage data concerning at least one telephone or infotainment system used by the driver in the motor vehicle, schedule data of the driver, and driving habits of the driver presented in a social network on the Internet;
      determining, by the monitoring device, an anticipated parking duration at a beginning of the parked phase based on the at least one usage pattern; and
      generating the trigger signal if the anticipated parking duration exceeds at least the length of time.

2. The method of claim 1, further comprising:
performing at least one of:
   determining at least one of the plurality of vehicle components required for the adjustment of the configuration data set based on a data networking architecture; and
   switching on the at least one of the plurality of vehicle components for the adjustment of the configuration data set.

3. The method of claim 1, further comprising:
receiving the configuration data set from the off-vehicle data source during a driving operation of the motor vehicle, when the drive motor is switched on.

4. The method of claim 1, wherein the configuration data set comprises at least one of: a software update for the control device, navigation data, and parameterization data for adjusting an operating behavior of the control device.

5. A control apparatus for a motor vehicle, wherein the control apparatus comprises at least one processor having a data input for receiving state data of an energy storage device and a control output for controlling a plurality of vehicle components of the motor vehicle, wherein the at least one processor of the control apparatus is configured to:
   predict an energy requirement of each of the plurality of vehicle components in the motor vehicle required for an adjustment of a configuration data set, wherein to predict the energy requirement, the at least one processor of the control apparatus is further configured to:
      determine a length of time required for the adjustment of the configuration data set in a control device;
      determine an amount of energy that is required for the length of time by each of the plurality of vehicle components during operation to fulfill the energy requirement; and
      determine, by the amount of energy, a predicted energy requirement of each of the plurality of vehicle components required for the adjustment of the configuration data set;
   receive a second configuration data set for a second control device;
   receive dependency data relating to the configuration data set and the second configuration data set;
   determine a currently-available remaining energy of an energy storage device of the motor vehicle; and
   transmit, to the control device, a trigger signal for the adjustment of the configuration data set, if during a parked phase when a drive motor of the motor vehicle is switched off, the currently-available remaining energy is greater than the predicted energy requirement, and the configuration data set is independent of the second configuration data set according to the dependency data, wherein to transmit the trigger signal, the at least one processor of the control apparatus is further configured to:
      determine, by a monitoring device, at least one usage pattern of a use of the motor vehicle by a driver, wherein to determine the at least one usage pattern, the at least one processor of the control apparatus is further configured to:
  determine behavioral data of the driver from the motor vehicle or from an off-vehicle data source; and
  combine, by machine learning of the at least one processor of the control apparatus, recurring values of the behavioral data to form the at least one usage pattern, wherein the behavioral data of the driver include at least one of: an identity of the driver, usage data concerning at least one telephone or infotainment system used by the driver in the motor vehicle, schedule data of the driver, and driving habits of the driver presented in a social network on the Internet;
  determine, by the monitoring device, an anticipated parking duration at a beginning of the parked phase based on the at least one usage pattern; and
  generate the trigger signal if the anticipated parking duration exceeds at least the length of time.

6. The control apparatus of claim 5, wherein the at least one processor of the control apparatus is further configured to:
  perform at least one of:
    determine at least one of the plurality of vehicle components required for the adjustment of the configuration data set based on a data networking architecture; and
    switch on the at least one of the plurality of vehicle components for the adjustment of the configuration data set.

7. The control apparatus of claim 5, wherein the at least one processor of the control apparatus is further configured to:
  receive the configuration data set from the off-vehicle data source during a driving operation of the motor vehicle, when the drive motor is switched on.

8. The control apparatus of claim 5, wherein the configuration data set comprises at least one of: a software update for the control device, navigation data, and parameterization data for adjusting an operating behavior of the control device.

9. A motor vehicle, having a control apparatus, wherein the control apparatus comprises at least one processor having a data input for receiving state data of an energy storage device and a control output for controlling a plurality of vehicle components of the motor vehicle, wherein the at least one processor of the control apparatus is configured to:
  predict an energy requirement of each of the plurality of vehicle components in the motor vehicle required for an adjustment of a configuration data set in a control device, wherein to predict the energy requirement, the at least one processor of the control apparatus is further configured to:
    determine a length of time required for the adjustment of the configuration data set;
    determine an amount of energy that is required for the length of time by each of the plurality of vehicle components during operation to fulfill the energy requirement; and
    determine, by the amount of energy, a predicted energy requirement of each of the plurality of vehicle components required for the adjustment of the configuration data set;
  receive a second configuration data set for a second control device;
  receive dependency data relating to the configuration data set and the second configuration data set;
  determine a currently-available remaining energy of an energy storage device of the motor vehicle; and
  transmit, to the control device, a trigger signal for the adjustment of the configuration data set, if during a parked phase when a drive motor of the motor vehicle is switched off, the currently-available remaining energy is greater than the predicted energy requirement, and the configuration data set is independent of the second configuration data set according to the dependency data, wherein to transmit the trigger signal, the at least one processor of the control apparatus is further configured to:
    determine, by a monitoring device, at least one usage pattern of a use of the motor vehicle by a driver, wherein to determine the at least one usage pattern, the at least one processor of the control apparatus is further configured to:
      determine behavioral data of the driver from the motor vehicle or from an off-vehicle data source; and
      combine, by machine learning of the at least one processor of the control apparatus, recurring values of the behavioral data to form the at least one usage pattern, wherein the behavioral data of the driver include at least one of: an identity of the driver, usage data concerning at least one telephone or infotainment system used by the driver in the motor vehicle, the schedule data of the driver, and driving habits of the driver presented in a social network on the Internet;
    determine, by the monitoring device, an anticipated parking duration at a beginning of the parked phase based on the at least one usage pattern; and
    generate the trigger signal if the anticipated parking duration exceeds at least the length of time.

10. The motor vehicle having the control apparatus of claim 9, wherein the at least one processor of the control apparatus is further configured to:
  perform at least one of:
    determine at least one of the plurality of vehicle components required for the adjustment of the configuration data set based on a data networking architecture; and
    switch on the at least one of the plurality of vehicle components for the adjustment of the configuration data set.

11. The motor vehicle having the control apparatus of claim 9, wherein the least one processor of the control apparatus is further configured to:
  receive the configuration data set from the off-vehicle data source during a driving operation of the motor vehicle, when the drive motor is switched on.

12. The motor vehicle having the control apparatus of claim 9, wherein the configuration data set comprises at least one of: a software update for the control device, navigation data, and parameterization data for adjusting an operating behavior of the control device.

* * * * *